(12) United States Patent
Inaba et al.

(10) Patent No.: US 7,094,350 B2
(45) Date of Patent: Aug. 22, 2006

(54) METHOD OF SLUDGE RECYCLING

(75) Inventors: Tsuguo Inaba, Saitama (JP); Masaki Sugino, Ibaraki (JP); Toshiyuki Nakazawa, Nagano (JP); Shingo Akiyama, Nagano (JP); Masahito Yamada, Nagano (JP); Chiyomitsu Kimura, Akita (JP); Toshinori Sato, Akita (JP); Masanori Mizuki, Akita (JP); Yasutami Yamaura, Nagano (JP); Masaharu Asukai, Nagano (JP); Keiichi Hosokawa, Osaka (JP); Norikazu Nishizawa, Nagano (JP); Mizuo Usuba, Tokyo (JP); Tatsushi Nojiri, Tokyo (JP); Suzu Furuki, Tokyo (JP); Tamaki Goto, Tokyo (JP); Hajime Inaba, Saitama (JP); Pang Yen Chang, Taipei (TW)

(73) Assignee: Roche Company, Saitama (JP)

( * ) Notice: Subject to any disclaimer, the term of this patent is extended or adjusted under 35 U.S.C. 154(b) by 77 days.

(21) Appl. No.: 10/704,686

(22) Filed: Nov. 12, 2003

(65) Prior Publication Data

US 2004/0168976 A1 Sep. 2, 2004

(30) Foreign Application Priority Data

Nov. 13, 2002 (JP) ............................ 2002-329880
Nov. 5, 2003 (JP) ............................ 2003-375976

(51) Int. Cl.
*C02F 3/00* (2006.01)

(52) U.S. Cl. ...................... 210/601; 210/615; 210/622
(58) Field of Classification Search ................ 210/615, 210/601, 622
See application file for complete search history.

(56) References Cited

U.S. PATENT DOCUMENTS 4,735,724 A * 4/1988 Chynoweth et al. ........ 210/603

FOREIGN PATENT DOCUMENTS

| JP | 10-216799 A | 8/1998 |
|---|---|---|
| JP | 11-285698 A | 10/1999 |
| JP | 2000-342670 A | 12/2000 |

* cited by examiner

*Primary Examiner*—Chester T. Barry
(74) *Attorney, Agent, or Firm*—Sughrue Mion, PLLC

(57) ABSTRACT

The present invention provides a method of sludge recycling by utilizing an existing facility as it is, degrading sludge efficiently and simply, and producing useful recycled water from treated water separated from the sludge, and an apparatus for sludge recycling. The present invention provides a method of sludge recycling including the steps of: bringing sludge into contact with a sludge degrading agent containing, as an active ingredient, microorganisms containing an *actinomyces* belonging to *Streptomyces*; degrading the sludge; separating the degraded sludge into a solid content and a liquid content; and producing recycled water from the liquid content.

7 Claims, 3 Drawing Sheets

METHOD OF SLUDGE RECYCLING

BACKGROUND OF THE INVENTION

1. Field of the Invention

The present invention relates to a method of effectively recycling sludge discharged in a large volume and an apparatus therefor.

2. Description of the Related Art

Waste water is treated by biological waste water treatments such as an activated sludge method at a public sewage treatment plant, a night-soil treatment plant, a rural community wastewater treatment plant, or the like. However, a problem exists in that a treatment of sludge in a large volume produced from such treatment systems is difficult. Further, sludge has been conventionally treated follows. Settled sludge has been pulled out from a sedimentation tank or the like, dehydrated by a dehydrator, and incinerated or landfilled for disposal. Nevertheless, such disposal requires tremendous labor and time, and cost of transport, incineration, or the like is high. Moreover, from environmental concerns, dumpsites for the sludge discharged successively and growing enormous naturally become limited, and in the near future, respective local governments may not be able to assure dumpsites for the sludge.

Further, a sludge reduction method reported conventionally is not suited for mass disposal, and in practice, most of the sludge has been landfilled. Therefore, there still remains the need for dumpsites. Moreover, an investment for a large-scale treatment facility is necessary for the treatment, and a problem exists in that the cost of the treatment mounts. Further, a method of recycling residual sludge has been sought, but a particularly useful means has not been found.

Further, JP 2000-342670 A describes a method of degrading sludge or organic substances effectively, and a high reduction rate of sludge is indicated. However, a solution to the treatment of residual sludge has not yet been found.

SUMMARY OF THE INVENTION

It is an object of the present invention is to provide a method of sludge recycling and an apparatus for sludge recycling by utilizing an existing facility as it is, degrading sludge efficiently in a simple manner, and producing useful recycled water from treated water separated from the sludge.

That is, the present invention provides a method of sludge recycling including the steps of: bringing sludge into contact with a sludge degrading agent containing, as an active ingredient, microorganisms containing an *actinomyces* belonging to *Streptomyces*; degrading the sludge; separating the degraded sludge into a solid content and a liquid content; and producing recycled water from the liquid content.

Further, the present invention provides the method of sludge recycling including the steps of: bringing sludge in contact with a sludge degrading agent; and bringing the environment in an aerobic atmosphere to degrade the sludge.

Further, the present invention provides the method of sludge recycling in which the sludge degrading agent contains, as an active ingredient, a zeolite-microorganisms complex obtained by bringing zeolite in contact with microorganisms containing an *actinomyces* belonging to *Streptomyces*.

Further, the present invention provides the method of sludge recycling including the steps of: separating the degraded sludge into a solid content and a liquid content; and passing the liquid content through a sludge degradation promoting layer; and producing recycled water from the liquid content.

Further, the present invention provides the method of sludge recycling including the steps of: separating degraded sludge into a solid content and a liquid content; adjusting a concentration of sludge in the liquid content; passing the liquid content through a sludge degradation promoting layer; and producing recycled water from the liquid content.

Further, the present invention provides the method of sludge recycling in which the sludge degradation promoting layer has a multilayer structure obtained by piling each of layers made of brick, natural stone, charcoal, and zeolite.

Further, the present invention provides the method of sludge recycling in which the sludge degrading agent further comprises photosynthetic bacteria.

Further, the present invention provides an apparatus for sludge recycling including: a sludge reduction tank having means for intermittently aerating sludge while agitating the sludge and means for separating the sludge into a solid content and a liquid content; and a recycled water producing tank having means for transferring the liquid content from the sludge reduction tank, means for producing recycled water from the liquid content, and means for intermittently aerating the liquid content under circulation.

Further, the present invention provides the apparatus for sludge recycling in which the recycled water producing tank includes a sludge degradation promoting layer having means for producing recycled water from the liquid content.

Further, the present invention provides the apparatus for sludge recycling in which the sludge degradation promoting layer has a multilayer structure obtained by piling each of layers made of brick, natural stone, charcoal, and zeolite.

DETAILED DESCRIPTION OF THE INVENTION

Figure 1:
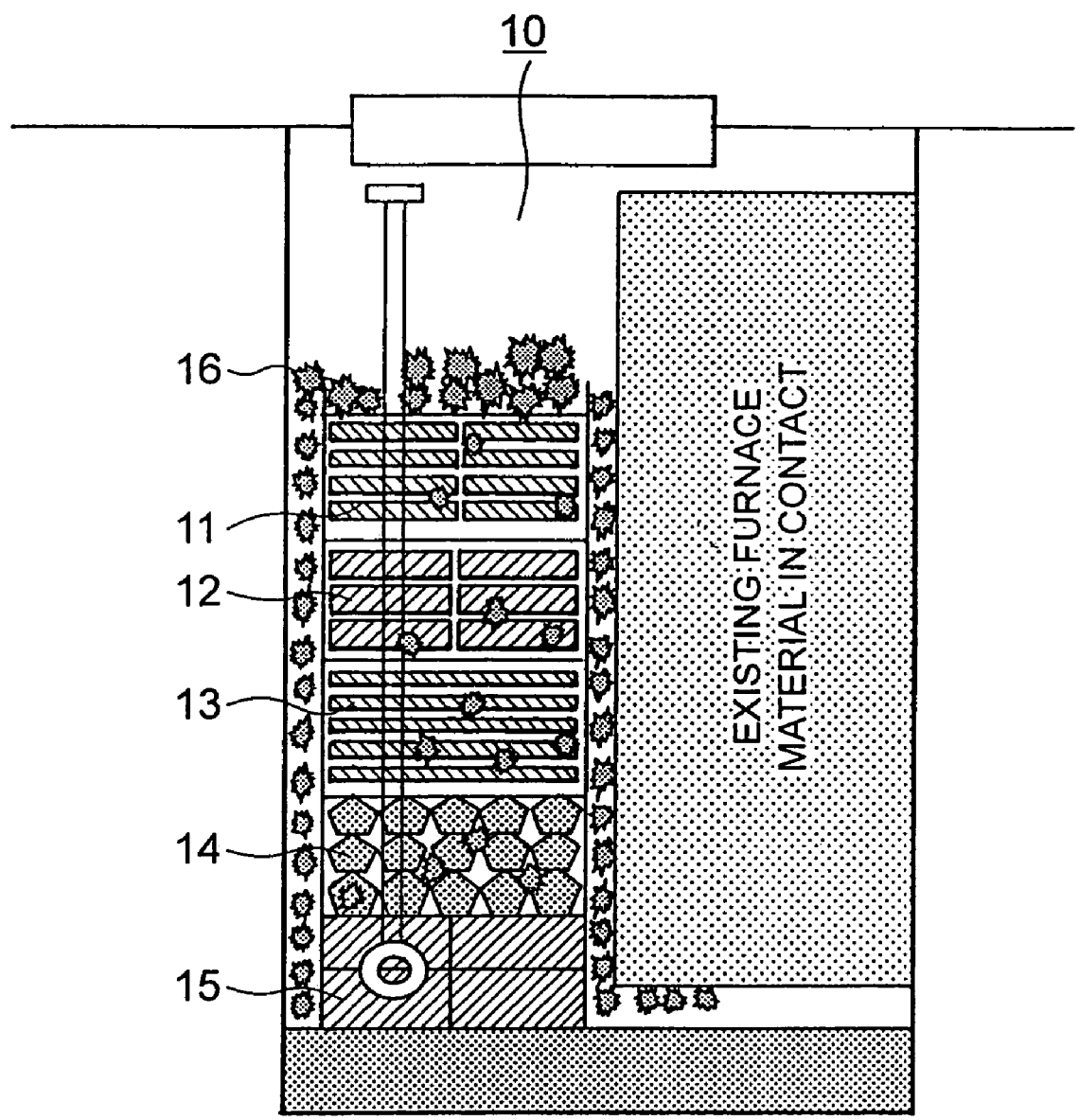
FIG. 1 is a diagram explaining a structure of a sludge degradation promoting layer.

The present invention provides a method of sludge recycling including the steps of: bringing sludge into contact with a sludge degrading agent containing, an active ingredient, microorganisms containing an *actinomyces* belonging to *Streptomyces*; degrading the sludge; separating the degraded sludge into a solid content and a liquid content; and producing recycled water from the liquid content.

Sludge to which a method of the present invention is applied is not particularly limited as long as the sludge contains an organic substance, and examples of the sludge may include sludge or excess sludge discharged from a public sewage treatment plant, a night-soil treatment plant, a rural community wastewater treatment plant, or the like.

A sludge degrading agent used in the present invention contains, as an active ingredient, microorganisms containing an *actinomyces* belonging to *Streptomyces* and has a function of strongly degrading an organic substance in the sludge when coming in contact with the sludge. The *actinomyces* belonging to *Streptomyces* exists in a state of a spore in sludge and can proliferate vitally by extending hypha while degrading an organic substance strongly. These *actinomyces* belonging to *Streptomyces* desirably account for 5 to 50% of the sludge degrading agent. Microorganisms containing *actinomyces* belonging to *Streptomyces* have only to exist (as microorganisms in the sludge degrading agent), but preferably contains together other aerobic bacteria and anaerobic bacteria. For example, as an *actinomyces, Thermoactinomyces* or *Nocardia* may be included in the microorganisms. As aerobic bacteria, *Pseudomonas aeruginosa, Comamonas, Sphingomonas,* or *Acinetobacter* may be included in the microorganisms. Furthermore, as others, *Nitrosomonas, Nitrobacter, Thiobacter, Azotobacter,* or the like may be included in the microorganisms.

Further, the present invention can use photosynthetic bacteria as a sludge degrading agent. The photosynthetic bacteria are exemplified by Gram-negative *bacilli* (small sized), particularly, purple nonsulfur bacteria.

Further, the sludge degrading agent used in the present invention has a stronger degrading effect by activating the activity of a microorganism existing in sludge to promote the degradation of the sludge. Further, the sludge degrading agent exerts a deodorization effect as well because the agent excels in the degradation of an organic substance. Examples of the sludge degrading agent preferably used in the present invention include commercial names "All Dash Soft (manufactured by Roche)", "All Dash Molt (manufactured by Roche)", and "All Dash P&C (manufactured by Roche)".

Further, the sludge degrading agent used in the present invention may take various forms. Examples of the forms include: microorganisms dispersed in an aqueous medium (water, e.g.); a zeolite-microorganisms complex formed by bringing microorganisms in contact with zeolite; and the complex dispersed in water. In any forms, a concentration of microorganisms, a ratio of microorganisms to the zeolite, or the like may be determined accordingly by taking into consideration a sludge concentration, peripheral environment of the sludge, or the like. Further, various additives not causing harmful effects to the microorganisms may be added to the aqueous medium if required.

Of those, the zeolite-microorganisms complex is preferable, in that the degrading effect is further enhanced because the microorganisms are adsorbed inside pores of the zeolite, to increase an area of contact with the sludge. The zeolite used is not particularly limited, but a mordenite zeolite may be used. For example, a zeolite with a commercial name "Mordenzeo powder (manufactured by Tohokushigenkaihatsu Corporation)" is preferable. In the case of the microorganisms being a solid (dry microbial cell, for example), a complex of the zeolite and the microorganisms may be prepared easily, for example, by agitating the zeolite and the solid microorganisms in an appropriate container. In the case of the microorganisms being dispersed in an aqueous medium, a complex may be prepared easily only by adding the zeolite to the aqueous medium.

The method of the present invention may include the steps of: bringing sludge in contact with a sludge degrading agent; and bringing the environment to an aerobic atmosphere to degrade the sludge. Further, the method of the present invention preferably includes the steps of: bringing sludge in contact with a sludge degrading agent; bringing the environment to an anaerobic atmosphere to conduct anaerobic degradation of the sludge; and successively bringing the environment to an aerobic atmosphere to conduct aerobic degradation of the sludge. With those steps, highly efficient degradation of the sludge can be carried out. Anaerobic degradation and aerobic degradation both can be performed in the sludge degrading agent used in the present invention because, as the microorganisms, a facultative anaerobe exists as the main body. Under an anaerobic condition, mainly, *actinomyces* belonging to *Streptomyces,* and under an aerobic condition, particularly, Gram-negative bacteria can actively degrade an organic substance. It is preferable to conduct aeration by introducing oxygen-containing gas to the sludge biweekly or continuously while agitating the sludge in order to enhance the function of the sludge degrading agent. Sludge degradation is preferably conducted in a temperature range of 15 to 40° C. A period of sludge degradation differs with a sludge concentration and the number of bacteria in the microorganisms, and therefore, may be determined accordingly depending on the measured value.

Further, after bringing sludge in contact with the sludge degrading agent, it is necessary to sustain the growth of microorganisms containing an *actinomyces* belonging to *Streptomyces* at the number of bacteria of at least about $1 \times 10^2$/mL to effectively degrade the sludge. To do so, measuring the number of bacteria accordingly and adding the sludge degrading agent depending on the measured value are preferable. The microorganisms are capable of retaining the same bacteria for a long period (1 to 2 years) in the sludge.

Thus, in the present invention, the step of bringing sludge in contact with a sludge degrading agent and to carry out sludge degradation is a primary treatment of producing recycled water from the sludge, which is called "sludge conditioning treatment". The sludge conditioning treatment is effective for sludge stored for a long time. This treatment is a treatment carried out by adding a sludge degrading agent to the stored sludge and by conditioning (activating) the function of the microorganisms inhabiting in the sludge through the action of microorganisms newly added to promote the sludge degradation of the entire tank.

Further, the microorganisms inhabiting in the degraded sludge excels in degrading ability. Therefore, undegraded sludge may be further added to the degraded sludge to repeat the sludge degradation step. In that case, the sludge degradation step can be repeated as long as the number of bacteria in microorganisms containing an *actinomyces* belonging to *Streptomyces* is measured to be at least about $1 \times 10^2$/mL. Thus, the present invention has an advantage in that the sludge can be sufficiently degraded even in a state in which the number of bacteria in microorganisms is as small as about $1 \times 10^2$/mL.

In the method of the present invention, for the step of separating the degraded sludge into a solid content and a liquid content, it is preferable to simply leave the degraded sludge at rest to precipitate the solid content and separate the liquid content as a supernatant. Further, various separating means may be applied. For example, a flocculating agent or the like may be added to separate the solid content and the liquid content from the sludge.

Next, in the step of producing recycled water from the liquid content obtained by separating from the sludge, the degradation of residual sludge in the liquid content is carried out. A sludge degradation promoting layer may be used for the degradation of the residual sludge. Here, the residual sludge is degraded by passing the liquid content through the sludge degradation promoting layer, and useful recycled water is produced from the obtained treated water. Any of means may be applied as long as the liquid content is passed through the means, and a direction in which the liquid content passes is not particularly limited. In the present invention, it is preferable that: the sludge degradation promoting layer is placed in an appropriate tank; the liquid content is added inside the tank; the tank is filled with the liquid content to allow complete immersion of the sludge degradation promoting layer; and then the liquid content pass through the sludge degradation promoting layer. In doing so, circulating the liquid content in the tank allows the liquid content to efficiently pass through the layer.

Further, adjusting a concentration of the sludge in the liquid content before passing the liquid content through the sludge degradation promoting layer is desirable for efficient sludge degradation. The concentration of the sludge is 8,000 mg/L or less, preferably 6,000 mg/L or less, and most preferably 5,000 mg/L or less. The sludge degradation is preferably carried out in the temperature range of 15 to 40° C. A period of sludge degradation differs with the concentration of the sludge, and therefore, may be determined accordingly depending on a measured value of the concentration. For example, degradation of the liquid content, adjusted to the sludge concentration of 5,000 mg/L or less, to about 200 mg/L in 1 to 2 weeks is possible by carrying out the degradation of residual sludge with intermittent aeration and circulation in the tank provided with the sludge degradation promoting layer.

The degradation of the residual sludge to the final sludge concentration of 200 to 1,200 mg/L is possible.

FIG. 1 is a diagram explaining a structure of a sludge degradation promoting layer.

In FIG. 1, a sludge degradation promoting layer 10 has a multilayer structure formed by piling a first layer 11 made of brick, a second layer 12 made of natural stone, a third layer 13 made of charcoal, and a forth layer 14 made of zeolite on an upper part of a base 15. The figure represents a favorable mode, and each of the layers may be piled in random order. Also, a sludge degrading agent 16 is added from the upper part of the sludge degradation promoting layer 10 and is adhered inside the layers.

The sludge degradation promoting layer 10 degrades sludge remaining in the liquid content separated from the sludge to produce useful recycled water and supplies various inorganic salt components to the liquid content. This action is caused by base materials such as brick, natural stone, charcoal, and zeolite in each of the layers. Brick is contained in the first layer while the brick used is not particularly limited. Natural stone is contained in the second layer, and among others, white granite is particularly preferable. As a shape of brick or natural stone, a discretional shape such as a block-shape, a crushed shape, and a granular shape can be used. Charcoal is contained in the third layer while the charcoal used is not particularly limited, and carbonaceous fuel generally used such as binchotan charcoal is preferable. Zeolite is contained in the forth layer. Zeolite forms a zeolite-microorganisms complex by being in contact with existing microorganisms or newly added microorganisms contained in the sludge degrading agent and contributes to the degradation of residual sludge. Zeolite used is not particularly limited. For example, mordenite zeolite may be used. Preferably, zeolite with a commercial name "All Dash Molt (manufactured by Roche)" can be used.

In the favorable mode of the present invention, the multilayer structure of the sludge degradation promoting layer 10 may be formed in a container having a meshed base and sides through which the liquid content to be treated can pass through by simply packing the above-mentioned base materials, or by preparing a packing for each base material and piling on sequentially the containers packed with each base material. The container used is not limited to a mesh type as long as the liquid content to be treated is allowed to pass through the container, and openings of various shapes may be formed across the base and sides of the container. The size of the openings should be small enough to prevent base materials from passing through. A material of the container may be plastic or metal and is not particularly limited.

In the present invention, the sludge degradation promoting layer 10 can be used by placing the layer in an appropriate tank of the existing facility as shown in FIG. 1. In this case, it is preferable to spray the sludge degrading agent 16 used in the present invention onto the entire wall surfaces of the tank used before placing the sludge degradation promoting layer 10. The sludge degrading agent used may be one above-mentioned, and particularly preferable is a mixture of commercial names "All Dash Soft (manufactured by Roche)" and "All Dash Molt (manufactured by Roche)" with a commercial name "Mordenzeo powder (manufactured by Tohokushigenkaihatsu Corporation)". Using the above mixture by spraying in the tank causes proliferation of a colony formed from the microorganisms on the wall surfaces, promoting sludge degradation, thereby sufficiently degrading the residual sludge. As described above, a facility can be easily arranged by placing sequentially piling base materials constituting the sludge degradation promoting layer 10 in a tank sprayed with the sludge degrading agent.

As descried, by using the sludge degradation promoting layer 10, inorganic salts can be discharged from the above base materials, an organic substance of residual sludge in the liquid content can be nearly completely converted to an inorganic substance, and the residual sludge in the liquid content can be degraded completely, to produce useful recycled water.

Further, the present invention provides an apparatus for sludge recycling including: a sludge reduction tank having means for intermittently aerating sludge while agitating the sludge and means for separating the sludge into a solid content and a liquid content; and a recycled water producing tank having means for transferring the liquid content from the sludge reduction tank, means for producing recycled water from the liquid content, and means for intermittently aerating the liquid content under circulation.

The sludge reduction tank is a tank in which the sludge and the sludge degrading agent are brought into contact with each other to conduct sludge degradation, for example, aerobic sludge degradation. That is, the sludge reduction tank is a tank for conducting the sludge conditioning treatment as used herein. Upon conducting sludge degradation, it is preferable to place a blower or the like introducing oxygen-containing gas into the tank for intermittent aeration. It is also preferable to place an agitator to introduce gas efficiently to the sludge degrading agent or the microorganisms in the sludge. The agitator is not particularly limited. Moreover, the sludge reduction tank also serves as a tank separating the degraded sludge into a solid content and a liquid content utilizing settling.

The recycled water producing tank is a tank degrading residual sludge in the separated liquid content and producing recycled water from the obtained treated water. It is preferable to place the above-mentioned sludge degradation promoting layer for producing recycled water from the liquid content. Upon conducting the degradation of the residual sludge, it is preferable to provide a circulation pump to circulate the liquid content inside the sludge degradation promoting layer. Additionally, it is preferable to place a blower or the like introducing oxygen-containing gas into the tank for intermittent aeration. Herewith, activity of existing microorganisms or newly added microorganisms can be activated. The blowers placed in the sludge reduction tank and the recycled water producing tank are controlled by a control panel.

The apparatus for sludge recycling of the present invention has an advantage of being placed easily within a tank of the existing facility. Further, the apparatus may have a conformation of placing the sludge reduction tank and the recycled water producing tank in the same site. Alternatively, the apparatus may have a conformation of placing the sludge reduction tank and the recycled water producing tank in separate sites.

Figure 2:
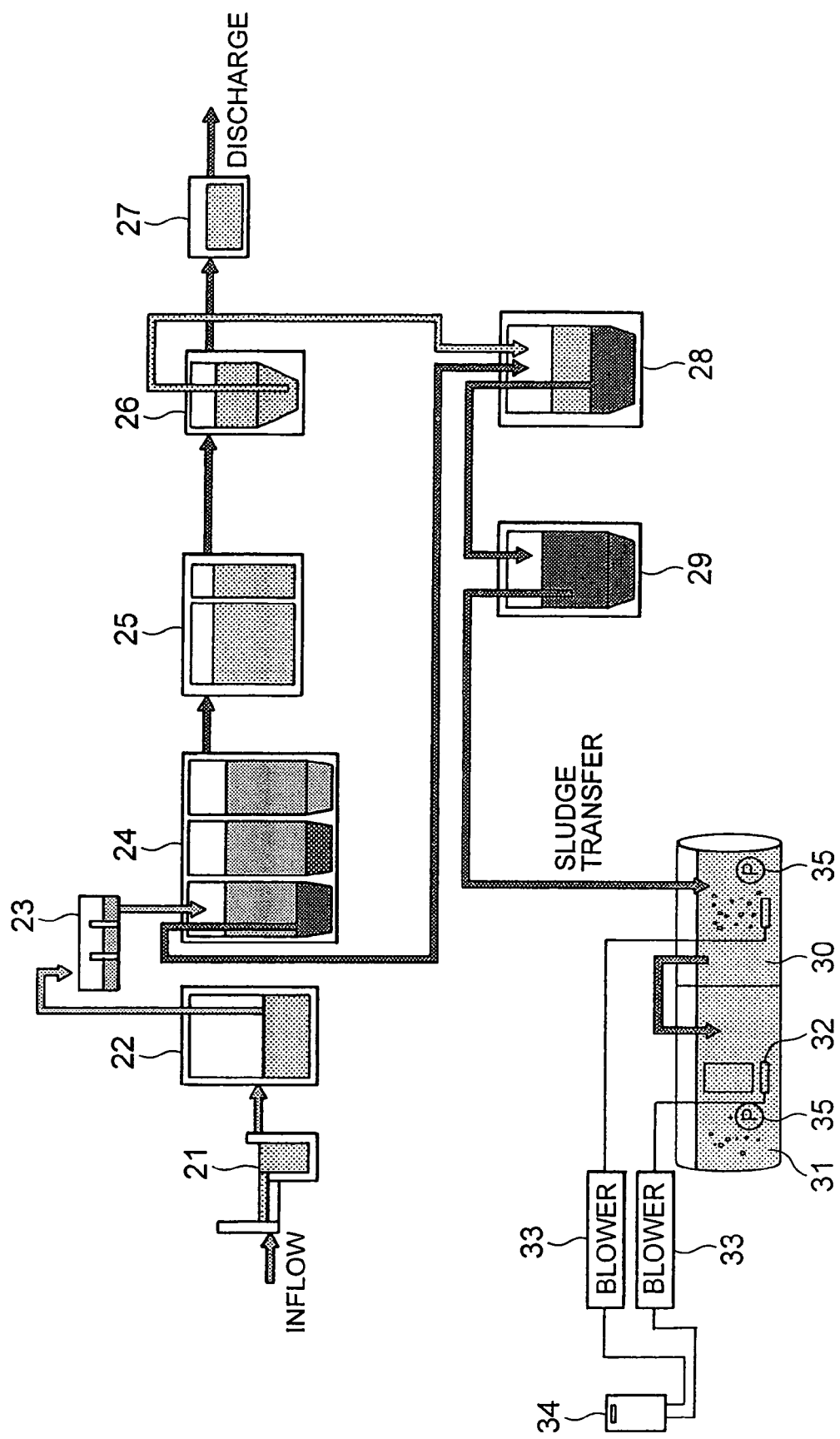
FIG. 2 Is a diagram of a community wastewater treatment system employing a conformation of placing a sludge reduction tank and a recycled water producing tank at a same site.

FIG. 2 shows a diagram of a community wastewater treatment system employing a conformation of placing a sludge reduction tank and a recycled water producing tank in the same site. (As an example, the rural community wastewater treatment system of Kamiyamada, Takatomachi, Kamiina District, Nagano Prefecture will be used for explanation.)

Inflowing treated water passes through a coarse screen, enters an aeration sedimentation tank 21, and then is fed to a flow control tank 22. Treated water taken out from the flow control tank 22 flows into a sewage measuring tank 23 to measure the treated water to be treated. Then, the measured treated water is introduced into an anaerobic filter bed tank 24, where microorganisms of the present invention degrade an organic substance in the treated water. Further, the microorganisms can be added to the flow control tank 22. Next, the treated water is transferred to a contact aeration tank 25, where aerobic bacteria in the microorganisms further degrade the organic substance. Next, the treated water proceeds to a sedimentation tank 26, where the sludge settles, and the liquid content is disinfected in a disinfecting tank 27 and released. The settled sludge is transported to a sludge thickening storage tank 28 and is further thickened. Also, the settled sludge at the anaerobic filter bed tank 24 is transported to the sludge thickening storage tank 28. The thickened sludge is transported to a sludge storage tank 29. Here, sludge conditioning treatment is conducted on the thickened sludge before the sludge is transferred to a sludge reduction tank 30. A prescribed amount of conditioned sludge is transferred to the sludge reduction tank 30. It is desirable to introduce the sludge after placing the sludge degrading agent at the bottom of the sludge reduction tank 30. Here, the sludge degradation takes place (in some cases, undegraded sludge from the sludge storage tank 29 may be introduced onto the degraded sludge for repeated degradation). The sludge is reduced in volume, left at rest to settle the sludge, and separated into a solid content and a liquid content. The liquid content is transferred to a recycled water producing tank 31. In this step, amounts of N, P, K and C are significantly reduced. Then, in the recycled water producing tank 31, recycled water is produced by the action of an installed sludge degradation promoting layer 32 while circulating the liquid content. In the sludge reduction tank 30 and the recycled water producing tank 31, oxygen-containing gas is introduced via a blower 33 connected to a control panel 34, and a circulation pump 35 is placed, respectively.

As described above, the method of sludge recycling and the apparatus for sludge recycling may be appropriately determined by taking into consideration the size of the wastewater treatment system, the degree of contamination of the treated water, the sludge degradation rate, the temperature of the environment, or the like.

EXAMPLES

Example 1

At the sewage treatment facility of Kishimadaira treatment center, Nagano Prefecture, the tank of the treatment facility was used to produce recycled water from stored sludge as the following.

After a sludge degrading agent "All Dash Molt" was placed at the bottom of the tank, sludge of about 10 $m^3$ in volume was introduced, air was introduced from a blower at a rate of 0.12 $kg/cm^3$, and aeration was repeated biweekly. The above procedure was conducted at 15° C. or above for 4 weeks. The sludge concentration before sludge degradation was 3,700 mg/L; however, after sludge degradation, the sludge concentration was 120 mg/L, which means nearly complete sludge degradation. 0.1 mL of microorganisms in the recycled water obtained from the degraded sludge was respectively spread onto Sabouraud's agar exclusive for *actinomyces* (manufactured by Eiken Co. LTD.) and SCD agar for general bacteria (manufactured by Eiken CO. LTD.) using a nichrome wire loop (inside diameter of 1 mm), respectively, and was cultured at 35 to 37° C. for 24 hours. The number of bacteria in the microorganisms grown was measured. As a result, the number of *actinomyces* was $5.0 \times 10^4$/mL, and the number of general bacteria was $4.0 \times 10^6$/mL. Further, undegraded sludge of about 10 $m^3$ in volume was introduced onto the degraded sludge, and the sludge was degraded under a similar condition. By repeating this operation two more times, through 4 times in total of the sludge degradation, recycled water of about 40 $m^3$ in volume was obtained.

The results of component analysis of finally obtained recycled water are shown in Table 3.

Example 2

Figure 3:
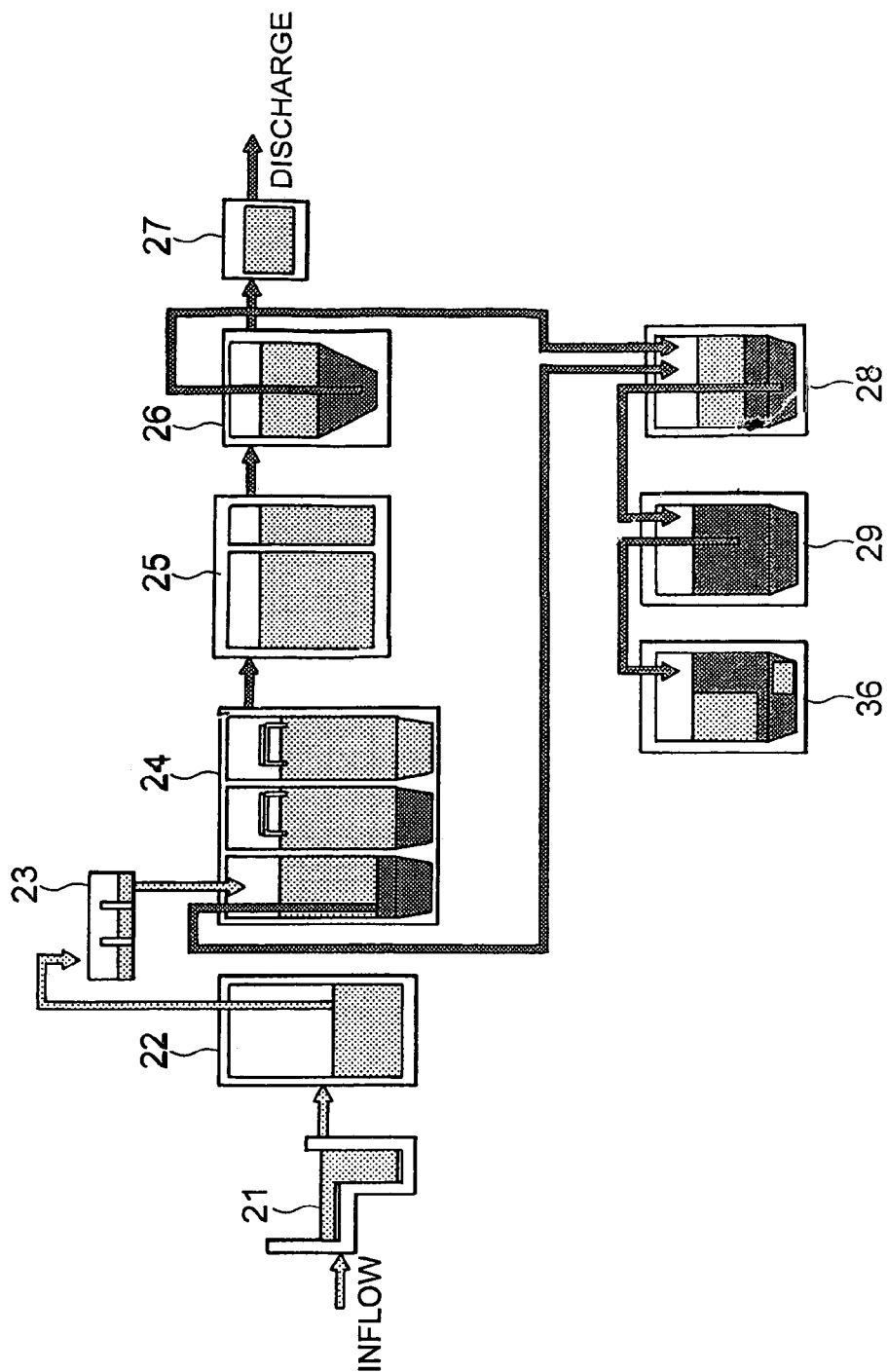
FIG. 3 is a diagram explaining a rural community wastewater treatment system of Example 2.

At the rural community wastewater treatment plant of Shigeno, Tobumachi, Akita Prefecture, the following was conducted to produce recycled water from stored sludge. FIG. 3 is a diagram showing a rural community waste water treatment system of Example 2. The sludge degradation was conducted by using the existing secondary sludge storage tank 36. Since explanations of other reference numerals are the same as in FIG. 2, detailed explanation is omitted.

To the wall surfaces of the secondary sludge storage tank 36 in FIG. 3., a sludge degrading agent (a mixture of All Dash Soft, All Dash Molt, and All Dash P&C, with Mordenzeo powder) was sprayed, and a colony formed of microorganisms was proliferated. Then, the sludge was transferred from the primary sludge storage tank 29 and introduced to the secondary sludge storage tank 36. Air was introduced from a sludge storage tank agitating blower at a rate of 0.12 $kg/cm^3$, and aeration was repeated biweekly. The above procedure was conducted at 15° C. or above for 3 months to degrade the sludge. The results of component analysis of recycled water obtained from the degraded sludge are shown in Table 3.

Further, the obtained recycled water was transferred to Moriyoshi Compost Center and was mixed with livestock (cow dung) mature organic compost. Accordingly, a fermentation promoting effect and a deodorization effect for livestock mature organic compost were apparent with the recycled water. As a result of using such a mixed solution to rice cultivation (production of Akitakomachi, 20 ha for the year 2000 and 30 ha for the year 2001), harvest was abundant than usual, and high quality Akitakomachi could be harvested. Herewith, it was shown that the recycled water could reduce the usage quantity of agricultural chemicals by promoting the activation of soil.

Example 3

At the rural community wastewater treatment plant of Araya, Tobumachi, Nagano Prefecture, stored sludge was conditioned. Afterwards, the obtained treated water was transferred to Tobumachi Culture Center, Nagano Prefecture, where production of recycled water was conducted. Described below is made for the production.

Sludge Conditioning Treatment

After a sludge degrading agent "All Dash Molt" was placed at the bottom of the sludge storage tank of the rural community waste water treatment plant of Araya, Tobumachi, Nagano Prefecture, sludge was introduced, air was introduced from a sludge storage tank agitating blower at a rate of $0.12\ kg/cm^3$, and aeration was repeated biweekly. The above procedure was conducted at 15° C. or above for 4 weeks. Further, undegraded sludge was introduced onto the degraded sludge, and the sludge was degraded under a similar condition. By repeating this operation one more time, through 3 times in total of the sludge degradation, sludge-conditioned water was obtained. The conditioned water was left at rest to be separated into a solid content and a liquid content, and the liquid content of about $22.2\ m^3$ in volume (Apr. 24, 2002) was transferred to Tobumachi Culture Center of Nagano Prefecture. The sludge concentration in the sludge storage tank before the sludge degradation was 25,000 mg/L, but the sludge concentration of the liquid content after the sludge degradation was 13,000 mg/L.

Here, the volume of sludge removal from Araya rural community wastewater treatment plant in the years 2000, 2001, and 2003 are shown in Table 1.

TABLE 1

| | Year 2000 ($m^3$) | Year 2001 ($m^3$) | Year 2002 ($m^3$) |
|---|---|---|---|
| April | 53.9 | 25.5 | 22.2 |
| June | 22.3 | 29.4 | 29.6 |
| August | 20.5 | 35.5 | 33.3 |
| September | | 39.1 | |
| October | 19.1 | 46.2 | 39.6 |
| January | 22.2 | | |
| march | 22.5 | | |
| Total volume of sludge removal ($m^3$) | 160.5 (A) | 175.7 (B) | 124.7 (C) |

160.5(A) + 175.7(B) = 336.2/2 = 168.1 (Average value)
168.1 − 124.7(C) = 43.4 $m^3$ As can be seen from Table 1, sludge digestion promotion with the sludge conditioning treatment allowed $43.4\ m^3$ of sludge reduction at the sludge storage tank of Ayara rural community wastewater treatment plant. In addition, a volume of sludge removal was 0 $m^3$ for a year from October 2001.

Recycled Water Production

An existing tank inside the Tobumachi Culture Center site in Nagano Prefecture, (1) a flow control tank (volume of 49.0 $m^3$), (2) a primary aeration tank (volume of 32.0 $m^3$), and (3) a secondary aeration tank (volume of 22.2 $m^3$) were respectively used to conduct recycled water production from the liquid content of transferred sludge-conditioned water of about 22.2 $m^3$ in volume (Apr. 24, 2002).

Before adding the liquid content into each tank, the concentration of the sludge in the liquid content was adjusted to (1) 6,600 mg/L, (2) 4,400 mg/L, and (3) 2,600 mg/L, respectively. Further, a sludge degradation promoting layer was placed in each tank, a sludge degrading agent (a mixture of All Dash Soft and All Dash Molt with Mordenzeo powder) was sprayed onto the entire wall surfaces of the tank, and a colony formed from microorganisms was proliferated. The placed sludge degradation promoting layer is the same as in FIG. 1, and is obtained by packing and piling zeolite, charcoal, white granite, and brick in this order from the bottom in a container with a width of 100 cm, a length of 50 cm, and a height of 160 cm. Packed base materials were 20 bricks (about 60 kg), 15 white granites (about 54 kg), 27 kg of charcoal, and 20 kg of zeolite.

Then, to the respective tanks (1) to (3), a liquid content with the adjusted concentration was added, and degradation of the residual sludge was conducted by the action of the placed sludge degradation promoting layer while circulating the liquid content, to produce recycled water.

From April to the end of October of 2002, about 22.2 $m^3$ (Apr. 24, 2002), about 29.6 $m^3$ (Jun. 26, 2002), about 33.3 $m^3$ (Aug. 28, 2002), and about 39.6 $m^3$ (Oct. 28, 2002) of the liquid content in the sludge-conditioned water were transferred to the respective existing tanks (1) to (3), and recycled water was produced from a total of 124.7 $m^3$ of sludge-conditioned water. A concentration of the sludge at the time was measured, and the results are shown in Table 2.

TABLE 2

| | Transfer volume ($m^3$) | | (1) Flow control tank Sludge concentration (mg/L) | (2) Primary aeration tank Sludge concentration (mg/L) | (3) Secondary aeration tank Sludge concentration (mg/L) |
|---|---|---|---|---|---|
| | Volume | Sludge concentration | | | |
| April 24 | 22.2 | 13,000 | 6,600 | 4,400 | 2,600 |
| May 10 | | | 3,550 | 210 | 184 |
| May 30 | | | 3,470 | 165 | 134 |
| June 26 | 29.6 | 16,000 | | | |
| July 3 | | | 15,000 | 3,800 | 3,600 |
| July 12 | | | 12,000 | 300 | 300 |
| July 25 | | | 11,000 | | |

TABLE 2-continued

| | Transfer volume (m³) | | (1) Flow control tank Sludge concentration (mg/L) | (2) Primary aeration tank Sludge concentration (mg/L) | (3) Secondary aeration tank Sludge concentration (mg/L) |
|---|---|---|---|---|---|
| | Volume | Sludge concentration | | | |
| August 28 | 33.3 | 16,300 | 14,300 | 4,450 | 4,200 |
| September 5 | | | 14,500 | 220 | 340 |
| September 13 | | | 11,080 | | 260 |
| October 4 | | | 9,800 | 150 | 110 |
| October 24 | | | 6,900 | | |
| October 28 | 39.6 | 18,000 | 15,000 | 2,500 | 1,550 |
| Total transfer volume | 124.7 | | | | |

As can be seen from the results of Table 2, in the case of adjusting the sludge concentration to a prescribed range, the sludge degradation rate was as high as 91 to 96%. Moreover, production of recycled water could be sufficiently processed in a short period of 1 to 2 weeks.

Further, 0.1 mL of microorganisms in the recycled water of the tanks (1) to (3) was sprayed onto Sabouraud's agar exclusive for *actinomyces* (manufactured by Eiken CO. LTD.) and SCD agar for general bacteria (manufactured by Eiken CO. LTD.), respectively, using a nichrome wire loop (inside diameter of 1 mm), and was cultured at 35 to 37° C. for 24 hours. The number of bacteria in the microorganisms grown was measured. The results are shown in Table 3.

TABLE 3

| Number of bacteria in the microorganisms | Flow control tank | Primary aeration tank | Secondary aeration tank |
|---|---|---|---|
| Number of actinomyces | $9 \times 10^3$/mL | $1.6 \times 10^3$/mL | $1.96 \times 10^3$/mL |
| Number of general bacteria | $1 \times 10^4$/mL | $2 \times 10^3$/mL | $2 \times 10^3$/mL |

Further, recycled water obtained from the tanks (1) to (3) finally was collected at a sedimentation tank, and the number of bacteria in microorganisms of recycled water at the sedimentation tank was measured in the same manner. For detection of *Escherichia coli*, ESCM agar exclusive for *Escherichia coli* (manufactured by Eiken CO. LTD.) was used. As a result, the number of *actinomyces* was $6 \times 10^2$/mL, the number of general bacteria was $1.6 \times 10^3$/mL, and no *Escherichia coli* was detected.

The results of component analysis of recycled water are shown in Table 4.

TABLE 4

| | Result of component analysis | Sewage treatment plant Kijimadaira (Example 1) | Rural community wastewater treatment plant Tobu-Machi (Example 2) | Rural community wastewater treatment plant Tobu-Machi (Example 3) |
|---|---|---|---|---|
| T-N | Total nitrogen | 24 | 67 | 33 |
| T-P | Total phosphorus | 41 | 9.4 | 21 |
| K | Potassium | 36 | 20 | 24 |
| Ca | Calcium | 33 | 14 | 60 |
| Zn | Zinc content | 0.5 | 0.03 | 0.07 |
| Cu | Copper content | 0.2 | 0.03 | 0.03 |
| Cr | Chromium content | 0.12 | <0.03 | <0.01 |
| Cd | Cadmium compound | <0.01 | <0.01 | <0.01 |
| Pb | Lead compound | <0.01 | <0.03 | <0.01 |
| As | Arsenic compound | <0.01 | 0.01 | 0.009 |
| Hg | Mercury compound | <0.0005 | <0.0005 | 0.0005 |
| Ni | Nickel | <0.1 | <0.01 | <0.1 |

As can be seen from the results of Table 4, the recycled water obtained in Examples 1 to 3 contains abundant inorganic salts, particularly, contains nitrogen, phosphorus, potassium, and calcium in large quantity, and is useful.

The recycled water obtained from the method of sludge recycling and the apparatus for sludge recycling of the present invention can be used for promoting rooting and growth of agricultural crops, supplementing shortage of trace elements caused by continuous cropping, preserving freshness of agricultural crops, promoting freshness, increasing the sugar content of agricultural crops, particularly fruits and vegetables, improving resistance to diseases and pests, or the like.

Further, obtained recycled water can be used by sprinkling to the pipe line and the booster pump of the public sewerage to remove and degrade scum causing bad smell stuck inside thereof to confine the generation of gas such as hydrogen sulfide to a trace amount.

Further, the obtained recycled water can degrade methyl mercaptane, hydrogen sulfide, or the like generated from a waste incinerator pit, a carry-in yard, a sludge storage tank, and grounds of sewerage plants. Therefore, the recycled water exhibits deodorization and degreasing effects.

Furthermore, according to the method of the present invention, sludge can be reduced to 1/20 under the following conditions: Sludge concentration=8000 mg/l; Sludge degradation period=4 to 6 weeks.

According to the present invention, there is provided the method of sludge recycling by utilizing an existing facility as it is, degrading sludge efficiently and simply, and producing useful recycled water from treated water separated from the sludge, and the apparatus for sludge recycling.

What is claimed is:

1. A method of sludge recycling, comprising the steps of:
bringing sludge into contact with a sludge degrading agent containing, as an active ingredient, microorganisms containing an *actinomyces* belonging to *Streptomyces* by passing the sludge through a sludge degradation promoting layer;
degrading the sludge;
separating the degraded sludge into a solid content and a liquid content; and
producing recycled water from the liquid content,
wherein said sludge degradation promoting layer comprises a multilayer structure formed by piling a layer of brick, a layer of natural stone, a layer of charcoal, and a layer made of zeolite on an upper part of a base;
wherein said sludge degrading agent is adhered to the surface of the layers; and
wherein said degrading step is carried out in an atmosphere alternating between anaerobic and aerobic.

2. A method of sludge recycling according to claim 1, wherein the sludge degrading agent comprises, as an active ingredient, a zeolite microorganisms complex obtained by bringing zeolite in contact with microorganisms containing an *actinomyces* belonging to *Streptomyces*.

3. A method of sludge recycling according to claim 2 wherein said zeolite-microorganisms complex further contains one or more of microorganism selected from the group consisting of *Thermoactinomyces, Nocardia, Pseudomonas aeruginosa, Comamonas, Sphingomonas, Acinetobacter, Nitrosomonas, Nitrobacter, Thiobacter* and *Azotobacter.*

4. A method of sludge recycling according to claim 2, wherein the zeolite is mordenite.

5. A method of sludge recycling according to any of claims 1 to 4,
wherein the natural stone is white granite and the charcoal is binchotan charcoal.

6. A method of producing recycling water having excellent fertilizer and deodorant effects, characterized in that liquid component resulted in the degradation of the sludge by the process according to claim 1 is gathered.

7. A method of sludge recycling according to any one of claims 2 and 3, wherein said sludge degrading agent further comprises photosynthetic bacteria.

* * * * *